(12) United States Patent
Peterson

(10) Patent No.: US 8,992,345 B2
(45) Date of Patent: Mar. 31, 2015

(54) DIGITAL COMPASS BALL MARKER

(71) Applicant: Jack W Peterson, Elk Ridge, UT (US)

(72) Inventor: Jack W Peterson, Elk Ridge, UT (US)

(*) Notice: Subject to any disclaimer, the term of this patent is extended or adjusted under 35 U.S.C. 154(b) by 76 days.

(21) Appl. No.: 13/737,837

(22) Filed: Jan. 9, 2013

(65) Prior Publication Data
US 2013/0178311 A1 Jul. 11, 2013
US 2014/0329620 A9 Nov. 6, 2014

Related U.S. Application Data

(63) Continuation-in-part of application No. 12/240,086, filed on Sep. 29, 2008.

(60) Provisional application No. 61/585,122, filed on Jan. 10, 2012.

(51) Int. Cl.
*A63B 57/00* (2006.01)

(52) U.S. Cl.
USPC .................................. 473/407; 463/4; 463/46

(58) Field of Classification Search
USPC ................................ 473/131, 407; 463/4, 46
See application file for complete search history.

(56) References Cited

U.S. PATENT DOCUMENTS

| | | | | |
|---|---|---|---|---|
| 5,582,554 A | * | 12/1996 | Stryczek | 473/407 |
| 6,890,273 B1 | * | 5/2005 | Perez | 473/404 |
| 2005/0101415 A1 | * | 5/2005 | Sweeney | 473/407 |

* cited by examiner

*Primary Examiner* — Omkar Deodhar
(74) *Attorney, Agent, or Firm* — Jarod R. Marrott; Kirton | McConkie

(57) ABSTRACT

The present invention extends to a digital compass ball marker that can be used to provide timely information to assist the golfer in determining a direction and force for a golf shot on a green. The digital compass ball marker can output this information using minimal information input by the golfer so that the use of the ball marker does not slow play, and in many cases, can speed play. The information provided by the ball marker can include a force with which to hit the shot and a direction to aim.

14 Claims, 8 Drawing Sheets

DIGITAL COMPASS BALL MARKER

CROSS-REFERENCE TO RELATED APPLICATIONS

This application claims priority to U.S. Provisional Patent Application Ser. No. 61/585,122, filed on Jan. 10, 2012 entitled "Digital Compass Ball Marker," and claims priority to U.S. patent application Ser. No. 12/240,086, filed on Sep. 29, 2008, entitled "Method and Device for Improving Putting."

BACKGROUND

Golf is played on golf courses that include various terrain features, including tees, fairways, roughs, woods, water hazards, sand traps (or bunkers), and golf greens (commonly referred to as "the green"). The terrain of the golf course is generally varied so as to enhance the difficulty and play experience of the golf course. The greens further include a hole into which the golfer attempts to place the golf ball. The object of the game is to move a golf ball from the tee into a hole located on each green throughout the golf course. The golf ball is moved from the tee to the green by hitting or stroking the ball with a golf club. Usually, more than one stroke is required to place the golf ball in the hole.

Great skill and precision is required to successfully stroke the golf ball onto the green and eventually into the hole. Once on the green, various physical contours and properties of the green must be analyzed by the player to aid the player in accurately putting the ball into the hole. Distance to the hole, lines, slopes, grades, wind speed, wind direction, wetness or dryness of the grass, the length of the grass, the grain of the grass and other variables must be taken into account when determining the direction and swing speed of the golf club.

Some of the most important considerations when putting are the position of the ball on the green and the distance between the ball and the hole. A player's likelihood of success largely depends upon the player knowing these pieces of information. Once the position and distance has been determined, the player may adjust his or her swing accordingly. The position of the ball and the distance between the ball and the hole is typically gauged by pacing or is otherwise estimated by the player. Accordingly, it is difficult to obtain an accurate measurement.

Sometimes, a golfer employs a caddie that is familiar with a course and can therefore offer advice on where to aim, how hard to hit a shot, what type of shot to hit, etc. However, caddies are generally not available for the average golfer. To address this, technology has been used to provide digital caddies in the form of electronics that provide much of the information generally provided by a caddy. For example, GPS devices are available that provide a distance to the hole or an obstacle to assist the golfer in selecting the appropriate club, type of shot, and swing force. Such devices are useful when hitting a drive, approach shot, or other relatively longer distance shot where precision is less important. However, when putting or chipping on the green, where both the direction and force of the shot must be precisely determined, such GPS devices provide little benefit.

Further, a key requirement of any digital caddy is that it must provide information in a sufficiently quick manner so as to not unacceptably slow play. GPS devices can be programmed with the coordinates of tee blocks, fairways, greens, and other features of a golf course so that an instant output of an important distance can be output at any time. Accordingly, because the golfer can rely on the distance output by the GPS device rather than relying on other physical markers on the golf course (e.g. by stepping off a distance from a distance marker), such devices can speed play. However, as stated above, these devices provide little benefit once the ball is on or in close proximity to the green.

BRIEF SUMMARY

The present invention extends to a digital compass ball marker that can be used to provide timely information to assist the golfer in determining a direction and force for a golf shot on a green. The digital compass ball marker can output this information using minimal information input by the golfer so that the use of the ball marker does not slow play, and in many cases, can speed play. The information provided by the ball marker can include a force with which to hit the shot and a direction to aim.

In one embodiment, the present invention comprises a digital compass ball marker that is used to determine the location of a ball on a green of a golf course. The digital compass ball marker comprises a housing containing an indication for orienting the ball marker with respect to a hole in the green when the ball marker is placed on the surface of the green proximate to a position of a ball lying on the green. The orientation defines a line from the ball marker that intersects the hole.

The ball marker also comprises: a compass that determines an angle between the line defined by the orientation and true north; an input module for receiving user input that defines an estimated distance between the position of the ball and the hole; a communication module that transmits the determined angle and the input distance to a server system and receives recommended swing parameters for putting the ball into the hole, the recommended swing parameters being calculated using the determined angle, the input distance, a known position of the hole, and known topography of the green; and a display for displaying the recommended swing parameters.

In another embodiment, the present invention comprises a method for generating recommended swing parameters for putting a golf ball on a green. An angle is received from a digital compass ball marker that is placed on a green, proximate to a ball lying on the green, in an orientation that defines a line between the ball marker and a hole in the green. The angle comprises the angle between the line defined by the orientation and true north.

An indication is then received of a distance between the ball and the hole. The angle and the indication of the distance are submitted to a server system. Then, recommended swing parameters for putting the ball into the hole are received from the server system. The recommended swing parameters are based on the angle, the distance, a known position of the hole, and known topography of the green.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
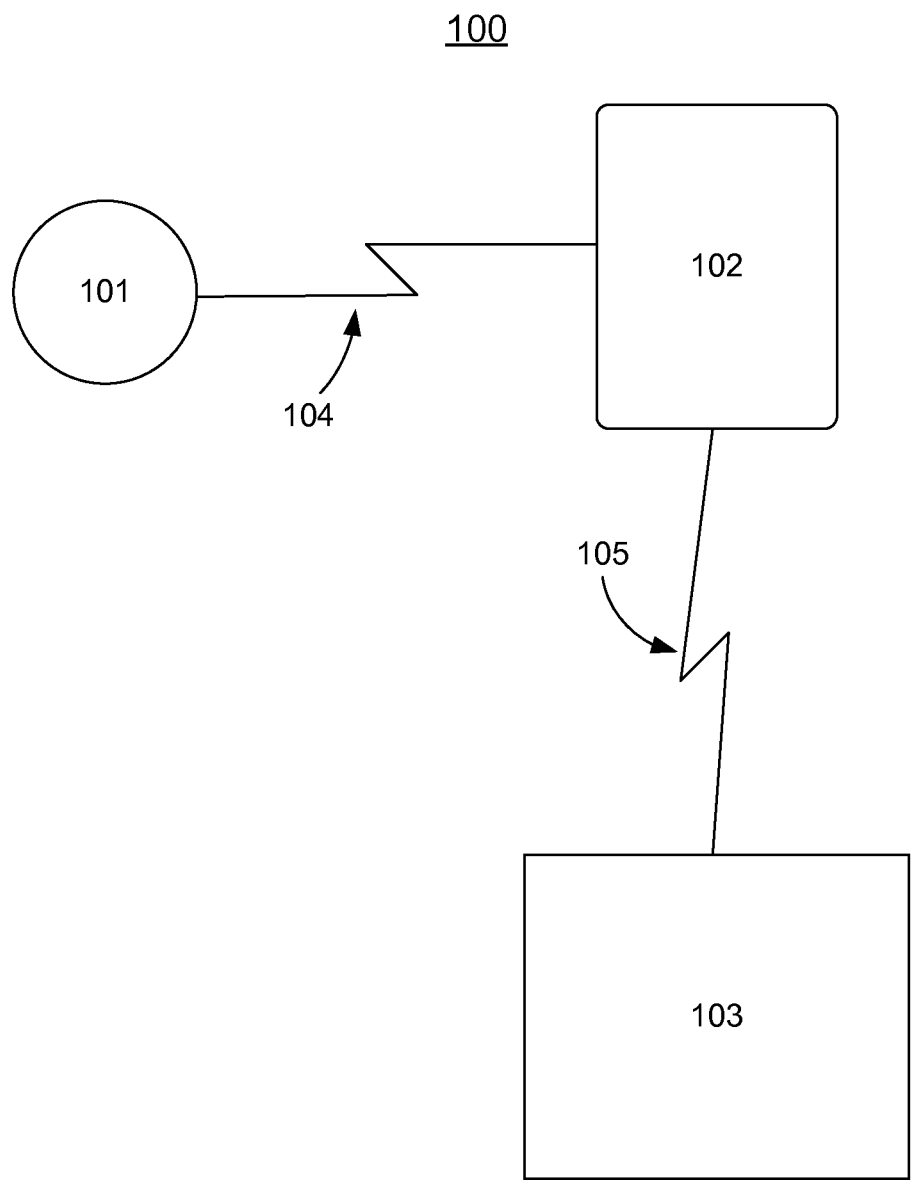
FIG. 1 illustrates an exemplary computer environment in which the present invention can be implemented.

The present invention extends to a digital compass ball marker that can be used to provide timely information to assist the golfer in determining a direction and force for a golf shot on a green. The digital compass ball marker can output this information using minimal information input by the golfer so that the use of the ball marker does not slow play, and in many cases, can speed play. The information provided by the ball marker can include a force with which to hit the shot and a direction to aim.

In one embodiment, the present invention comprises a digital compass ball marker that is used to determine the location of a ball on a green of a golf course. The digital compass ball marker comprises a housing containing an indication for orienting the ball marker with respect to a hole in the green when the ball marker is placed on the surface of the green proximate to a position of a ball lying on the green. The orientation defines a line from the ball marker that intersects the hole.

The ball marker also comprises: a compass that determines an angle between the line defined by the orientation and true north; an input module for receiving user input that defines an estimated distance between the position of the ball and the hole; a communication module that transmits the determined angle and the input distance to a server system and receives recommended swing parameters for putting the ball into the hole, the recommended swing parameters being calculated using the determined angle, the input distance, a known position of the hole, and known topography of the green; and a display for displaying the recommended swing parameters.

In another embodiment, the present invention comprises a method for generating recommended swing parameters for putting a golf ball on a green. An angle is received from a digital compass ball marker that is placed on a green, proximate to a ball lying on the green, in an orientation that defines a line between the ball marker and a hole in the green. The angle comprises the angle between the line defined by the orientation and true north.

An indication is then received of a distance between the ball and the hole. The angle and the indication of the distance are submitted to a server system. Then, recommended swing parameters for putting the ball into the hole are received from the server system. The recommended swing parameters are based on the angle, the distance, a known position of the hole, and known topography of the green.

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

Exemplary Computing Environment

FIG. 1 illustrates an exemplary computing environment 100 in which the present invention can be implemented. Computing environment 100 represents a typical implementation of the present invention; however, as clarified below, other implementations are also possible.

Computing environment 100 includes a digital compass ball marker 101 that is connected to a mobile computing device 102 (e.g. a smart phone) via connection 104. Connection 104 can typically be a Bluetooth connection; however, any other type of connection over which two computing devices can communicate could be used. Mobile computing device 102 is connected to server system 103 via connection 105. Connection 105 can typically be a mobile network data connection; however, any other type of connection can also be used.

Mobile computing device 102 can be any type of computing device that can be carried by the golfer. In a typical example, mobile computing device 102 can be the golfer's smart phone having an app for communicating with ball marker 101 and server system 103. Server system 103 represents any number and type of interconnected server computing resources. For example, server system 103 can represent a cloud of computing resources or a single server. Accordingly, the particular architecture of mobile computing device 102 and server system 103 is not essential to the invention.

In typical usage, a golfer will carry ball marker 101 and mobile computing device 102 onto the green, and use ball marker 101 to mark his ball. Ball marker 101 communicates information to mobile computing device 102 which is routed to server system 103. Server system 103 uses the information to calculate the force and direction information for the shot and routes this information back to ball marker 101 via mobile computing device 102. Ball marker 101 can then display the force and direction information to the golfer to assist the golfer in playing the shot.

Exemplary Ball Marker

Figure 2:
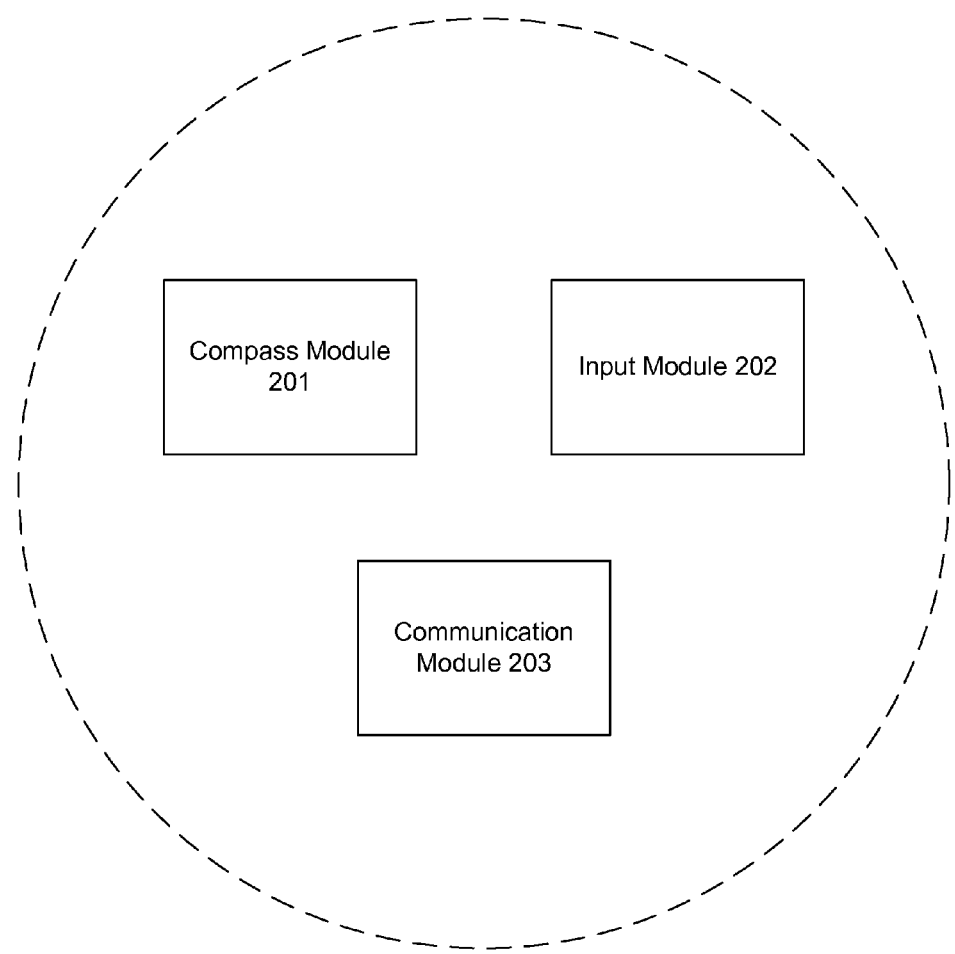
FIG. 2 illustrates an exemplary configuration of a ball marker.

FIG. 2 illustrates ball marker 101 in further detail. As shown, ball marker 101 can include a compass module 201, an input module 202, and a communication module 203. Compass module 201 can be used to determine an angle from true north at which the ball marker is placed. The role of compass module 201 will be further described below. Input module 202 comprises any type of logic or circuitry for receiving user input. For example, input module 202 can comprise components for receiving user input via a touch screen, buttons, wheels, speech, etc. Similarly, communication module 203 can comprise any type of logic or circuitry for communicating with another computing device such as mobile computing device 102. For example, communication module 203 can include components for communicating using Bluetooth, Wi-Fi, Infrared, NFC, or any other suitable type of communication protocol.

In some embodiments, compass module 201 can include magneto-inductive technology that is used to determine true north. In some embodiments, compass module 201 comprises a magnetometer such as a 3-axis tilt compensated compass (e.g. the OS4000 Nano Compass which is available from OceanServer Technology, Inc).

Compass module 201 may further comprise circuitry and components to electronically sense the difference in the Earth's magnetic field from a disturbance caused by external elements, such as ferromagnetic materials and any magnetic field generated by the remaining components of ball marker 101. For example, in some embodiments compass module 201 further comprises an embedded microcontroller that determines and subtracts any magnetic distortions from the stronger earth magnetic field thereby resulting in a highly accurate true north reading.

Determining Recommended Swing Parameters Using a Ball Marker

Figure 3:
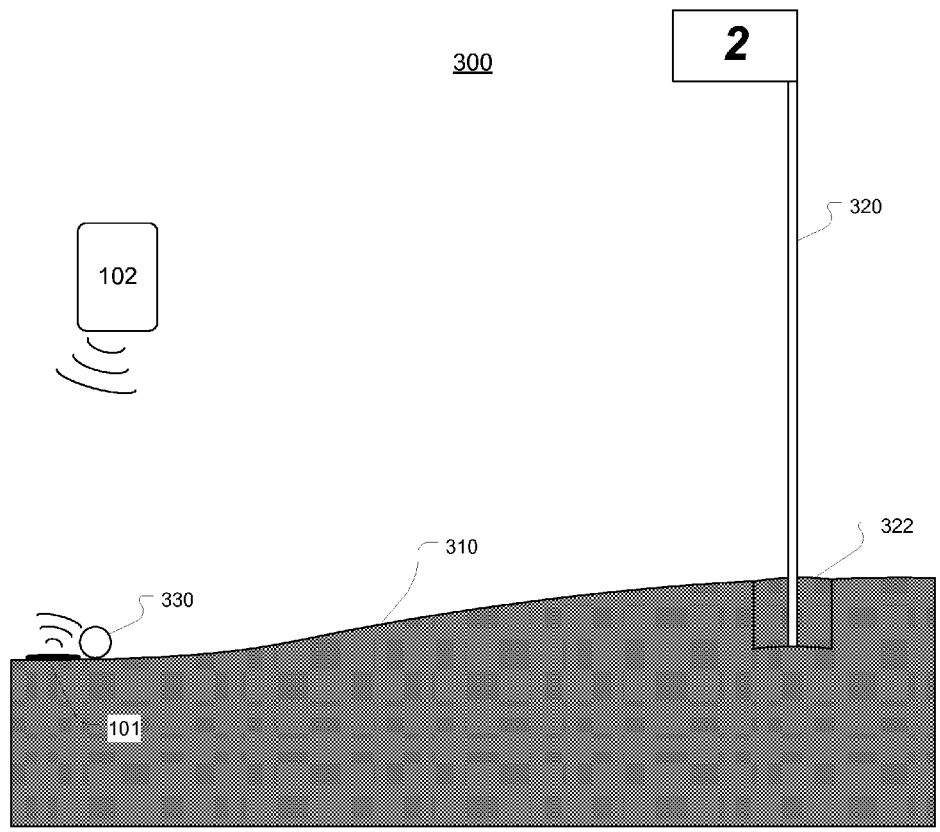
FIG. 3 illustrates a side cross-sectional view of a green on which a ball marker is used in accordance with one or more embodiments of the present invention.

Referring now to FIG. 3, a cross-sectional side view of a green 300 is shown. Green 300 generally comprises a putting surface 310 having a hole 322 marked by a flagstick or pin 320. Putting surface 310 comprises grass that is cut very short so that a golf ball 330 may roll for a long distance. Putting surface 310 may further include various physical contours, such as slopes or grades which are designed to challenge the player in placing the ball 330 into hole 322. Accordingly, a player must account for the physical contours of putting surface 310 when putting ball 330 into hole 322.

To accurately provide swing parameters (e.g. force and direction information) for putting ball 330 into hole 322, three general pieces of information must be known: (1) the position of ball 330 on green 300; (2) the position of hole 322 on green 300; and (3) the topography of green 300 (e.g. the slope of putting surface 310 between ball 330 and hole 322). The present invention enables the quick determination of the required information and the calculation of recommended swing parameters in an accurate manner without slowing play.

Specifically, the topography of green 300 and the position of hole 322 can be preprogrammed into server system 103 (because the topography should remain constant and the position of hole 322 is changed relatively infrequently and can be updated accordingly). However, the position of ball 330 is different for each golfer. Accordingly, ball marker 101 can be used to determine the position of ball 330 on green 300. The determination of the position of ball 330 can use two types of data: (1) the angle from true north formed by a line between the ball 330 and the hole 322; and (2) the distance between ball 330 and hole 322.

Figure 4:
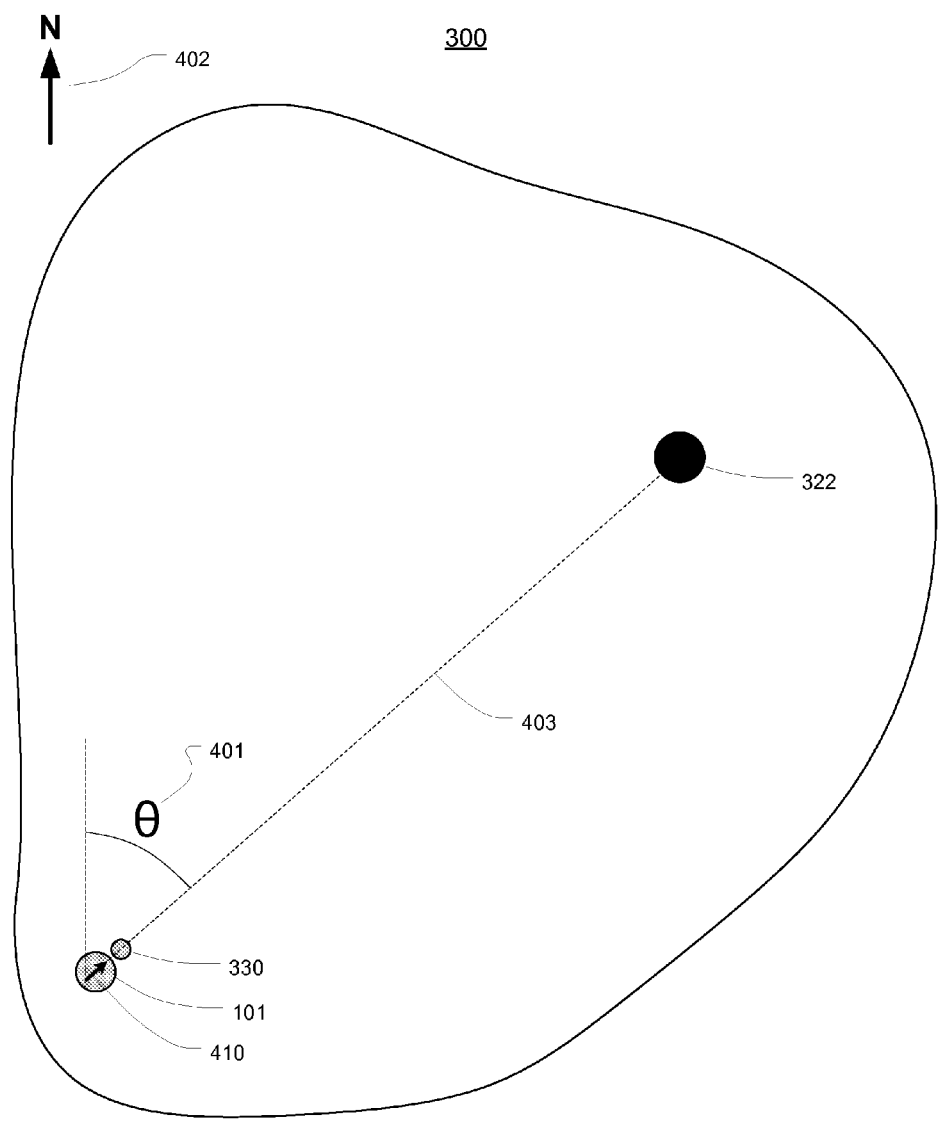
FIG. 4 illustrates a top view of a green on which a ball marker is used in accordance with one or more embodiments of the present invention.

FIG. 4 illustrates a top view of green 300 to describe how ball marker 101 uses compass module 201 to determine the angle 401 from true north 402 formed by a line 403 between the ball 330 and the hole 322. Ball marker 101 can include an indication for orienting the ball marker in the appropriate position. As shown in FIG. 4, the indication can be an arrow 410 contained or displayed on ball marker 101 that is aligned with hole 322 when the ball marker is placed behind the ball. This indication can define the line 403 between the ball and the hole. In other embodiments, ball marker 101 can have a particular shape (e.g. a triangular shape) or other feature that defines the indication.

When ball marker 101 is appropriately oriented behind the ball so that the indication is pointing towards the hole, an angle between true north 402 and the line 403 defined when the ball marker is thus oriented can be reported by ball marker 101 to mobile computing device 102. For example, as shown in FIG. 4, the line 403 defines an angle of 40 degrees from true north which can be reported by ball marker 101 to mobile computing device 102. Although FIG. 4 shows ball 330 being left on the putting surface during the placement of ball marker 101, in a typical scenario, ball 330 is picked up after being marked by ball marker 101.

Next, the distance between the ball and the hole can be obtained in various ways. In one embodiment, the distance can be obtained from the golfer as an estimate. For example, the golfer can view the distance, step off the distance, measure the distance with a separate device, etc. and provide an estimate. In this manner, the distance can be quickly and easily provided so that the rate of play is not slowed when ball marker 101 is used. In some embodiments, the distance can also be provided using one or more photographs as further described below.

Figure 5:
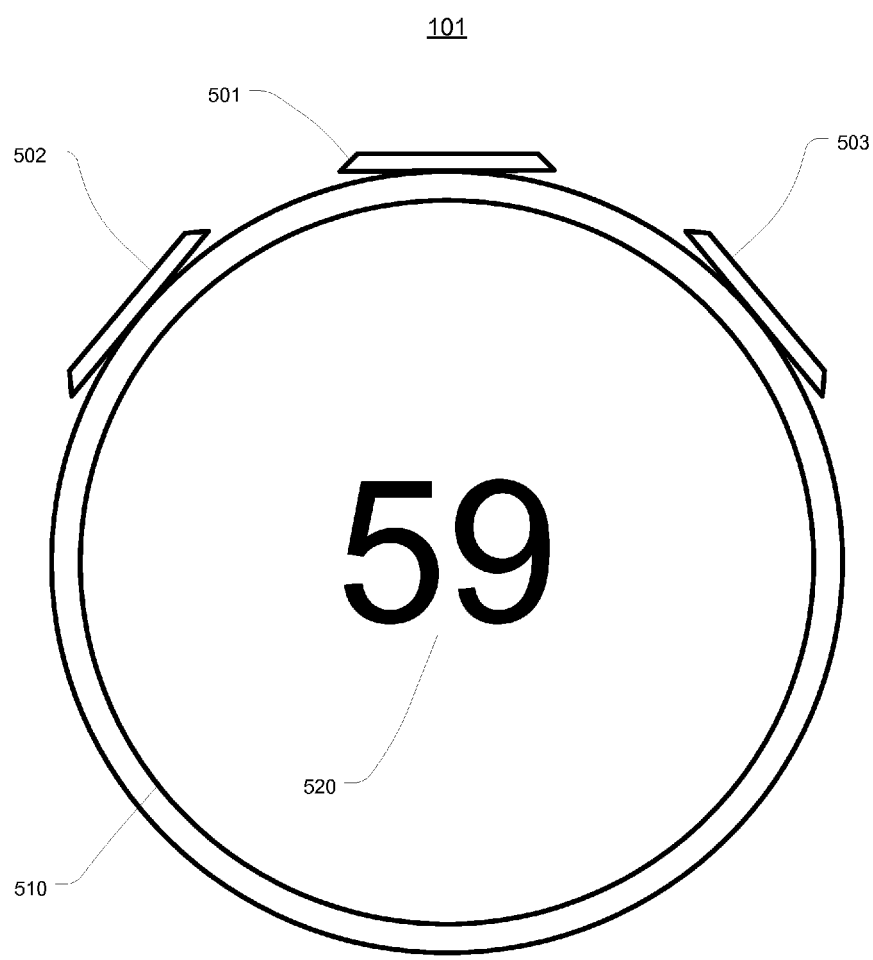
FIG. 5 illustrates an exemplary view of a display on a ball marker that is used to receive user input of an estimated distance.

FIG. 5 illustrates an exemplary configuration of ball marker 101 that can be used to receive golfer input of an estimated distance. In FIG. 5, ball marker 101 is shown as having three input buttons 501-503 and a display 510 that displays a distance 520 (which is shown as being 59 ft.). Buttons 501-503 can be pressed to input or modify distance 520.

For example, in one exemplary configuration, button 501 can be pressed to switch between modes for entering distance and for requesting an angle. Prior to placing ball marker 101 behind ball 330, the estimated distance can be input such as by using buttons 502 and 503. For example, button 502 can be used to change the value of the most significant digit of distance 520 (5 in this case), and button 503 can be used to change the value of the least significant digit of distance 520 (9 in this case).

As described above, buttons 501-503 are only one way in which input can be provided to ball marker 101, and any other type of input device or means can also be used. For example, display 510 can be a touch display so that no buttons or other input controls are required. In other cases, a combination of buttons or other input controls and a touch screen call also be provided. Similarly, ball marker 101 can be configured to accept speech input in some embodiments. Accordingly, ball marker 101 can receive user input of an estimated distance in any appropriate manner.

Once a distance is input, ball marker 101 can be placed behind the ball 330, as shown in FIG. 4, after which the ball is typically removed from the green. Referring specifically to the example in FIG. 5, after a distance is input, button 501 can be pressed to switch to the mode for acquiring an angle. In this mode, ball marker 101 can use compass module 201 to determine an angle from true north and submit the angle and the distance input by the golfer to server system 103 via mobile computing device 102. In some embodiments, compass module 201 can be configured to detect the angle once ball marker 101 has been at rest for a specified duration of time or in response to input from the golfer (which would allow the golfer to align the indication with the hole prior to the angle determination being made). Once the angle is determined by compass module 201, ball marker 101 can be picked up or otherwise removed from the putting surface.

As can be seen, in this manner ball marker 101 only requires the golfer to input an estimated distance and then place the ball marker behind the golf ball. Typically, a golfer is required to mark his ball on the green with some type of ball marker, and therefore, placing ball marker 101 behind ball 330 does not require any additional time than would otherwise be taken by the golfer.

Using the present invention, the only additional step required of the golfer is the input of an estimated distance. However, because ball marker 101 can provide recommended force and direction information for putting the ball, which the typical golfer would otherwise spend a significant amount of time determining mentally, the use of ball marker 101 may not slow play, and in many cases may even speed play.

For example, as will be more fully described below, ball marker 101 can inform the golfer approximately how hard the put should be hit and the approximate direction to aim. This information can be determined and returned immediately by server system 103 for display on ball marker 101 thereby relieving the golfer from having to spend the time to figure out this information on his own. The golfer only needs to view the information on ball marker 101 and play the shot accordingly.

Using the estimated distance input by the golfer and the angle calculated by compass module 201, server system 103 can accurately determine the position of the ball on the green. Using this position in combination with the known position of the hole and the topography of the green, server system 103 can calculate the approximate amount of force with which the ball should be hit, and the approximate direction to hit the ball. For example, based on the topography of the green between the position of the ball and the hole, server system 103 can determine that the hole is four feet uphill from the ball and that there is a rightward slope of 10 degrees. Server system 103 can therefore recommend hitting the ball x feet to the left of the hole (to account for the break to the right) and with a force y (to account for the uphill slope).

Figure 6A:
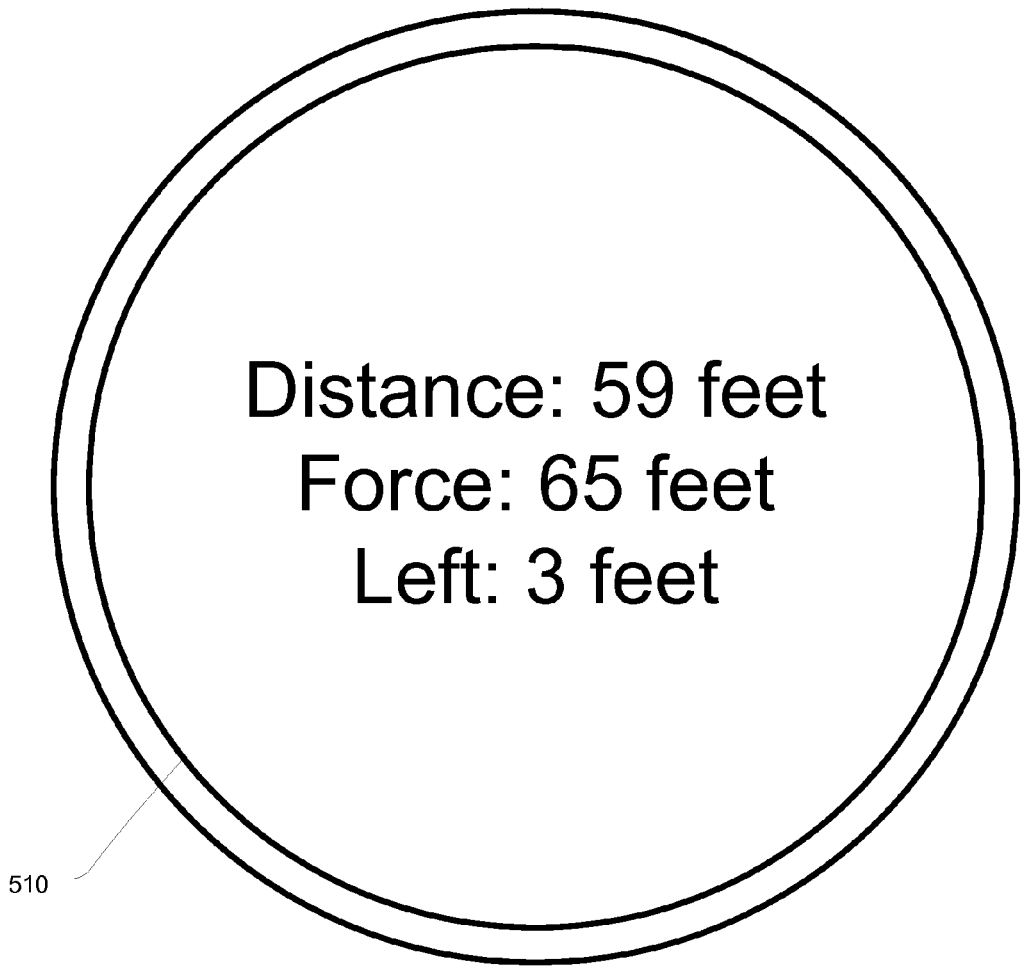
FIGS. 6A-6B illustrate exemplary views of a display on a ball marker that is used to display recommended swing parameters to a golfer.

FIG. 6A illustrates an exemplary display of recommended force and direction information on ball marker 101 using the example numbers from the previous paragraph. As shown, given an estimated distance of 59 feet and the other known parameters, server system 103 has recommended that the putt be hit with a force of 65 feet (i.e. with a force that would result in the ball moving 65 feet over a flat green) and at 3 feet to the left of the hole.

Figure 6B:
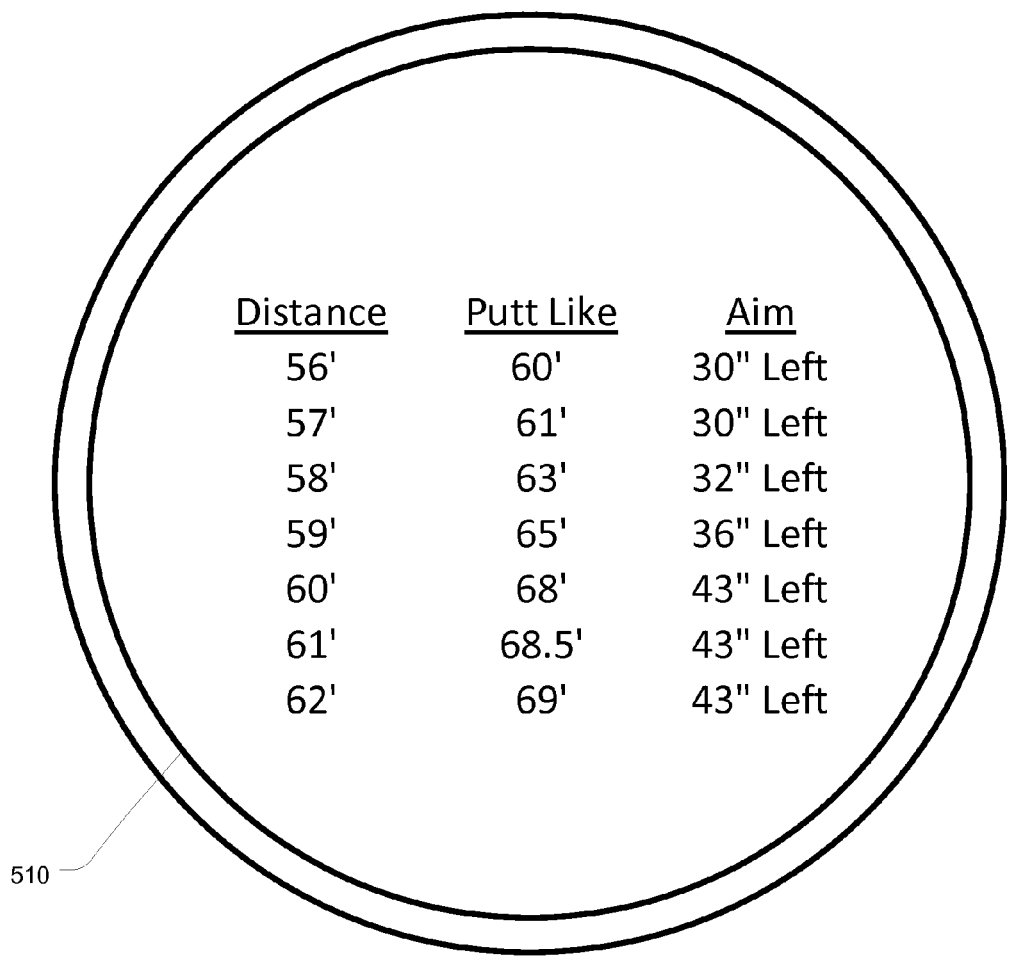

In some embodiments, server system 103 can also provide recommended force and direction information for other distances around the estimated distance. For example, because the estimate is likely not to be perfectly accurate, server system 103 can calculate recommended force and direction information for distances of 56, 57, 58, 60, 61, and 62 feet using the same determined angle. FIG. 6B illustrates an exemplary display that includes recommended swing parameters for multiple distances. The number of distances for which swing parameters are recommended can be a user configurable parameter or may vary based on the topography of the green.

In this way, the golfer can easily see if a change in the estimated distance will result in a significant change in the recommended shot. For example, if a significant break existed at 60 feet from the hole but not at 58 feet from the hole (as shown in FIG. 6B by the 11" difference between the recommended aim for 58' and 60'), the golfer could see the significant difference between recommended force/distance information and adjust his shot accordingly. However, if the force/distance information changed essentially linearly with the estimated distance, the golfer need not be too concerned that following recommended information for the wrong distance will give undesirable results.

Variations in the Employed Computing Environment

The above described embodiments are generally preferred because they minimize the chance that the use of the invention will slow the rate of play. However, the present invention can also be implemented with other variations.

For example, in some embodiments, ball marker 101 may not include input or display capabilities. In such cases, mobile computing device 102 can be used to receive the golfer's estimated distance, and to display the recommended force/direction parameters to the golfer. Ball marker 101 can include compass module 201 that determines an angle as described above and communication module 203 that relays this angle to mobile computing device 102. Accordingly, in such embodiments, the ball marker is placed in the same manner as described above, but the golfer is required to interface with mobile computing device 102 to input the estimated distance and to view recommended swing parameters.

Also, even in embodiments as described above where the ball marker includes input and display capabilities, the golfer may choose to use either ball marker 101 or mobile computing device 102 to provide input and to view recommended swing parameters. Using mobile computing device 102 may be less desirable because it may tend to slow the rate of play. For example, if the golfer is removing his cell phone from his pocket each time he desires to input distance information or to view recommendation information, it may slow play.

In other embodiments, ball marker 101 can include functionality so that a separate mobile computing device 102 is not required. In such cases, ball marker 101 can include functionality to directly communicate with server system 103. For example, ball marker 101 can communicate directly over a mobile data network, a Wi-Fi network, or another type of network providing direct internet access to server system 103. In some embodiments, a golf course may desire to place routers or other access points within proximity of a green to allow ball marker 101 to use Wi-Fi communications to transfer information to and receive information from server system 103. Of course, other communication protocols could also be used in a similar manner.

In further embodiments, it is also possible that ball marker 101 or mobile computing device 102 contain sufficient processing power and storage to perform the functions of server system 103 described above. In such cases, ball marker 101 (or ball marker 101 in communication with mobile computing device 102) would not need to communicate with any other computing device, but could calculate recommended force/direction parameters using stored hole location and topography information in conjunction with an input estimated distance and determined angle. Although this embodiment may be financially unfeasible due to the enormity of the data that is processed to provide swing parameter recommendations, it is provided to emphasize that the invention should not be limited to any particular computer environment or architecture.

Calculating Position of Ball Using GPS Coordinates

In other variations, the calculation and provision of recommended force/direction information can be accomplished using only GPS data. Current GPS devices generally lack the precision necessary to provide useful force/direction recommendations (because an error of even a foot in detecting location can result in relatively useless data). However, advances in GPS technology that improve the accuracy of determining the exact location of a ball (e.g. within inches of the exact location) would enable a ball marker to be used that detects its position using GPS data alone. In other words, the force/direction information could be calculated as described above using the known location of the hole and topography in conjunction with a position of the ball reported by the ball marker using GPS coordinates.

Estimating Distance Using Stereophotogrammetry

In some embodiments, rather than requiring the golfer to input an estimated distance, the distance between a ball and the hole can be estimated using stereophotogrammetry techniques. Stereophotogrammetry is a sophisticated technique which involves estimating the three-dimensional coordinates of a ball and a hole on a putting surface using a photograph that includes the ball and the pin (or flagstick). In such embodiments, mobile computing device 102 can be used to take a photograph with sufficient resolution to allow server system 103 to calculate the distance using the pixels of the photo. This calculation also employs the angle determined using compass module 201 in the manner described above. In some cases, GPS coordinates can also be used to enhance this calculation.

The photograph can be taken in various ways such as: (1) from behind the ball in approximate alignment with the pin at a distance which captures both the pin and the ball within the vertical field of view; (2) from between the ball and hole at a distance which captures both the pin and the ball within the horizontal field of view; or (3) from over top of the ball which captures the pin but not the ball. In some embodiments, multiple photographs can be taken and analyzed using stereophotogrammetry techniques.

In cases where the photograph is taken of only the pin, known parameters about the height of the camera when taking the picture can be used in the stereophotogrammetry calculations. For example, the golfer can take a photograph with the camera positioned at chest level. Prior to taking the picture (e.g. when registering an account), the golfer can specify his height or a height at which he holds mobile computing device 102 when taking a picture. This height can then be used in the calculation.

Other Parameters Usable in Calculating Swing Parameters

When calculating the optimal putt swing speed, it may be desirable to compensate for the weight or "mass" of the golfer's putter. Accordingly, in some embodiments, ball marker 101 and/or mobile computing device 102 further comprises an input field where the golfer is prompted to enter a value which indicates the mass of the golfer's putter (e.g. by directly inputting the mass, by inputting the putter model, etc.).

Ball marker 101 and/or mobile computing device 102 can also be configured to determine or receive other variable parameters that may affect a putt such as wind speed, grass length, humidity, etc. In some embodiments, one or more of these additional parameters can be reported to server system 103 and used in the calculation of the recommended swing parameters.

Database for Storing Putt Data

In some embodiments, the systems of the present invention further include a user database which is configured to record and store putt data and other calculations determined by ball marker 101 and mobile computing device 102 during the golfer's round of golf. For example, in some embodiments information received and calculated by ball marker 101 and/or mobile computing device 102 is uploaded to a database which is made available to the golfer for subsequent analysis and record-keeping. For example, a golfer may be required to register or subscribe to a database service to gain access to the golfer's putt data. Alternatively, mobile computing device 102 may include a database software application which is configured to automatically store and update the golfer's putt data in real-time. Further still, in some instances a database is provided which is part of a social network where the golfer's putt data (e.g. the length of putts and ball orientation) is posted and made available for public viewing and comment. The golfer's putt data may further be updated to a community website that is provided for tracking a golfer's progress or activity. The golfer's putt data may further include a topographical image of green 100, thereby providing a visual representation of the golfer's putt data.

In some embodiments, mobile computing device 102 (or server system 103) analyzes the golfer's putt data to learn green 100 and thereby modify putt instructions based upon the precise position of a ball. Thus, mobile computing device 102 (or server system 103) comprises learning capabilities. In some embodiments, the learning capabilities of mobile computing device 102 further analyze and learn the mechanics or tendencies of the golfer's club swing and thereby modify the putt instructions to compensate for the golfer's style and/or skills.

In some embodiments, the systems and devices of the present invention are further used in combination with a swing speed trainer which is designed to assist the golfer in learning and/or adjusting his swing speed. A swing speed trainer may include a software application and hardware which analyzes a golfer's golf swing and swing speed in real-time during the golfer's putting practice. For example, in some instances a swing speed trainer is provided having portable hardware for following the golfer's swing using six degrees of freedom to detect detailed results of each putter stroke in real-time. As such, the swing speed trainer may provide the golfer with practice swing information such as the degree to which the given swing at a planned point of impact was open, closed, forward of the putter sweet spot, behind the sweet spot, lofted or de-lofted. This information may be used in combination with the information derived by ball marker 101 and mobile computing device 102 to provide the golfer with accurate and personalized ball line and swing speed values to assist the golfer in taking their putt stroke.

Receiving Hole Location

Golf courses often change the hole location on the greens. Therefore, each time a hole location is moved, it is necessary to update the known hole location used by server system 103. This can be accomplished in various ways.

When the topography of the green is determined, the location of one or more fixed features (e.g. sprinkler heads) around the green can be determined and stored with the topography information. Then, each time a new hole location is selected, a tripod (or similar device) can be placed over top of the fixed feature and used to identify the precise location of the new hole location.

The calculation of the new hole location can be performed in a similar manner as described above with respect to determining the position of the ball on the green. That is to say, the tripod can be placed so that it aims directly at the new hole location. An insert can be placed in the new hole location to assist in aiming the tripod towards the new hole location. The tripod can contain a compass module (similar to compass module 201) that determines an angle from true north at which the tripod is placed, and can contain a distance calculation module (e.g. a laser distance measurement device) that accurately determines the distance between the fixed feature and the new hole location (i.e. the insert in the new hole location). The angle and distance can be uploaded to server system 103 which calculates a new hole location using the known location of the fixed feature.

Of course, this process could also be performed in reverse by placing the insert (or its equivalent) over top of the fixed feature and placing the tripod overtop of the new hole location. The server system 103 could be notified of where the measurements were taken to allow the appropriate calculation.

Alternatively, rather than placing the tripod over top of the fixed feature each time the hole location is updated, the old hole location can be used as the known location for calculating the new hole location. In other words, because server system 103 already knows the old hole location, the new location can be determined using the angle and distance parameters with respect to the old hole location.

For example, the tripod can be placed over top of the old hole location and positioned with respect to the new hole location as described above (i.e. by aiming it towards the insert and determining the distance). The angle and distance can be reported to server system 103 which can calculate the new hole location accordingly. Again, this process could also be performed in reverse by placing the tripod over the new hole location and placing the insert in the old hole.

In some embodiments, the golf course can be provided with the option to update the hole location using any of the above described approaches. In such cases, the tripod or other device used to submit angle and distance information to server system 103 can include the ability to specify which locations (e.g. fixed feature, old hole, or new hole locations) were used to obtain the angle and distance.

In summary, the present invention employs a ball marker that can be used to submit ball location to a server system in a quick and efficient manner thereby allowing the quick provision of swing parameter recommendations so that the pace of play is not slowed. The ball marker of the present invention can therefore provide additional enjoyment to the game of golf by assisting golfers to be more proficient putters. Further, although the above description has primary described the use of ball marker to determine putting recommendations, the same techniques can be applied to provide swing recommendations for other types of shots onto the green such as chipping and pitching. For example, by determining the position of a ball next to or near the green, the present invention can provide swing parameter recommendations that account for the green topography when the golfer is chipping or pitching onto the green.

Figure 7:
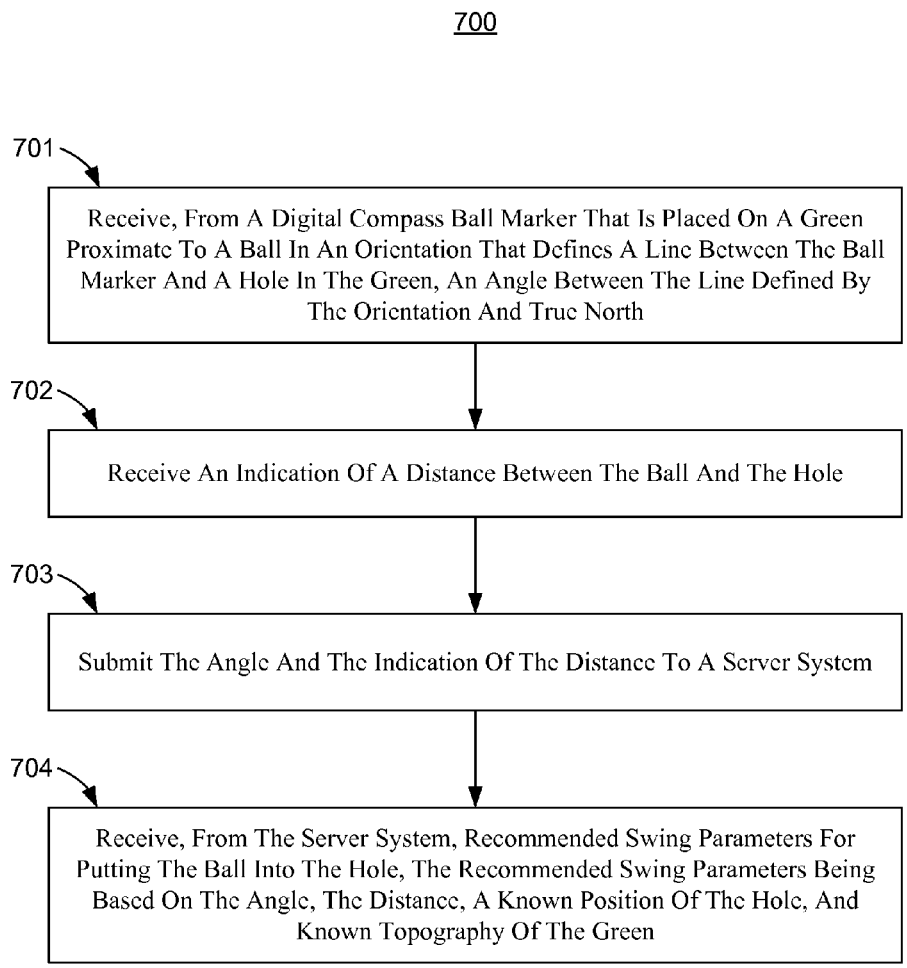
FIG. 7 illustrates a flowchart of an exemplary method for generating recommended swing parameters for putting a golf ball on a green.

FIG. 7 illustrates a flowchart of an exemplary method 700 for generating recommended swing parameters for putting a golf ball on a green. Method 700 can be implemented by a computing device such as a golfer's smart phone or other device carried by the golfer.

Method 700 includes an act 701 of receiving, from a digital compass ball marker that is placed on a green, proximate to a ball lying on the green, in an orientation that defines a line between the ball marker and a hole in the green, an angle between the line defined by the orientation and true north. For example, mobile computing device 102 can receive an angle from ball marker 101 when or after ball marker has been placed on a green.

Method 700 includes an act 702 of receiving an indication of a distance between the ball and the hole. For example, an estimated distance can be input to ball marker 101 and transmitted to mobile computing device 102, can be input directly into mobile computing device 102, or one or more photographs which include the pin and/or ball can be taken by or provided to mobile computing device 102.

Method 700 includes an act 703 of submitting the angle and the indication of the distance to a server system. For example, mobile computing device 102 can submit the angle and indication of the distance to server system 103.

Method 700 includes an act 704 of receiving, from the server system, recommended swing parameters for putting the ball into the hole, the recommended swing parameters being based on the angle, the distance, a known position of the hole, and known topography of the green. For example, mobile computing device 102 can receive recommended swing parameters from server system 103 that can be displayed to the golfer either on mobile computing device 102 or on ball marker 101.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A digital compass ball marker for determining the location of a ball on a green of a golf course, the ball marker comprising:
   a housing containing an indication for orienting the ball marker with respect to a hole in the green when the ball marker is placed on the surface green proximate to a position of a ball lying on the green, the orientation defining a line from the ball marker that intersects the hole;

a compass that determines an angle between the line defined by the orientation and true north;

an input module for receiving user input that defines an estimated distance between the position of the ball and the hole;

a communication module that transmits the determined angle and the input distance to a server system and receives recommended swing parameters for putting the ball into the hole, the recommended swing parameters being calculated using the determined angle, the input distance, a known position of the hole, and known topography of the green; and a display for displaying the recommended swing parameters.

2. The digital compass ball marker of claim 1, wherein the input module comprises one or more of:
a touch screen;
one or more buttons;
one or more wheels; or
a speech input module.

3. The digital compass ball marker of claim 1, wherein the communication module transmits the determined angle and the input distance to a mobile computing device which routes the determined angle and input distance to the server system.

4. The digital compass ball marker of claim 3, wherein the communication module transmits the determined angle and input distance via a Bluetooth connection with the mobile computing device.

5. The digital compass ball marker of claim 1, wherein the recommended swing parameters comprise a force with which to hit the ball and a distance relative to the hole at which to aim.

6. The digital compass ball marker of claim 1, wherein the recommend swing parameters include recommended swing parameters for the input distance and for one or more other distances.

7. The digital compass ball marker of claim 1, wherein the display comprises one or more of: a visual display, or an audible display.

8. A method, performed by a computing device, for generating recommended swing parameters for putting a golf ball on a green, the method comprising:

receiving, from a digital compass ball marker that is placed on a green, proximate to a ball lying on the green, in an orientation that defines a line between the ball marker and a hole in the green, an angle between the line defined by the orientation and true north;

receiving an indication of a distance between the ball and the hole;

submitting the angle and the indication of the distance to a server system; and receiving, from the server system, recommended swing parameters for putting the ball into the hole, the recommended swing parameters being based on the angle, the distance, a known position of the hole, and known topography of the green.

9. The method of claim 8, further comprising:
sending the recommended swing parameters to the digital compass ball marker for display on the digital compass ball marker.

10. The method of claim 8, further comprising;
displaying the recommended swing parameters on the computing device.

11. The method of claim 8, wherein the indication of the distance comprises an estimated distance input by a golfer into the digital compass ball marker.

12. The method of claim 8, wherein the indication of the distance comprises an estimated distance input by a golfer into the computing device.

13. The method of claim 8, wherein the angle is received from the digital compass ball marker via one or more Bluetooth communications.

14. The method of claim 8, wherein the computing device is a smart phone.

* * * * *